F. C. Gridley,

Threshold.

No. 3,848. Reissued Feb. 22. 1870.

Witnesses:
L. Hailer.
Phil. T. Dodge

Inventor
F. C. Gridley.
by Dodge & Munn
his attys.

N. PETERS, PHOTO-LITHOGRAPHER, WASHINGTON, D. C.

United States Patent Office.

F. C. GRIDLEY, OF HUDSON, WISCONSIN.

*Letters Patent No.* 56,209, *dated July* 10, 1866; *reissue No.* 3,848, *dated February* 22, 1870.

IMPROVED WEATHER-STRIP.

The Schedule referred to in these Letters Patent and making part of the same.

*To all whom it may concern:*

Be it known that I, F. C. GRIDLEY, of Hudson, in the county of St. Croix, and State of Wisconsin, have invented certain new and useful Improvements in Weather-Strips for Doors; and I do dereby declare that the following is a full, clear, and exact description thereof, reference being had to the accompanying drawings making a part of this specification, and to the letters of reference marked thereon.

Like letter indicate like parts wherever they occur.

To enable others skilled in the arts to construct and use my invention, I will proceed to describe it.

My invention consists in a novel construction and arrangement of devices for closing the opening at the bottom of doors to prevent the admission of wind, rain, dust, snow, &c., as hereinafter explained.

Figure 1:
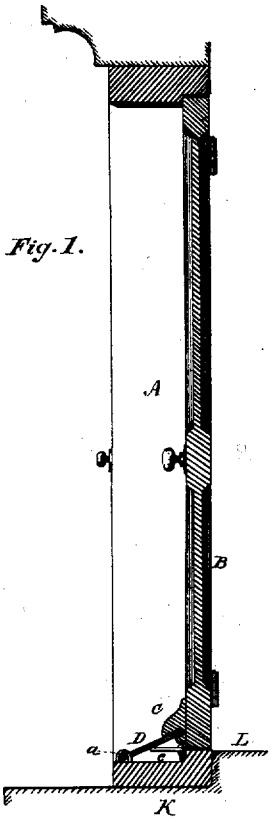
Figure 1 represents a vertical section of a door, with my improvement applied thereto.
Figure 2:
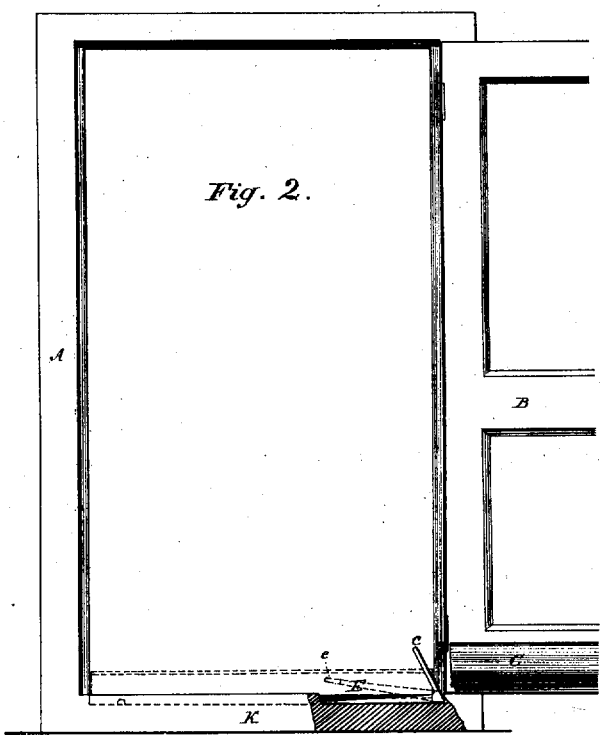
Figure 2 is an elevation, looking from the inside of a room outward, with the door swung open.

To construct and apply my improved weather-strip, I first provide a strip of wood, C, made preferably in the form of molding, as shown in section in fig. 1, and after forming a groove longitudinally along its under front edge, in an inclined position, I secure this grooved strip to the door B, on its outer side, near the bottom, as represented in figs. 1 and 2.

The door-sill K has a ledge, L, directly under the door, as shown in fig. 1; and on the sill K, in front of this ledge, I place a metallic strip, D, which is hinged at its outer edge to the sill by a couple of small staples. *a*, this strip D being so located that, when it is raised to an inclined position, and the door is closed, the inner or loose edge of the strip D will enter and rest in the groove in the strip C attached to the door, as shown in fig. 1.

Figure 3:
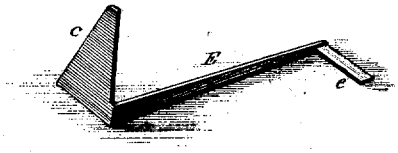
Figure 3 is a perspective view of the operating-lever, shown detached.

To elevate the strip to this position as the door is closed, I construct the lever E as shown in fig. 3.

This may be formed in any suitable way, the simplest and cheapest being to stamp or cut it from a plate of sheet metal in a flat form, and then form the arms *c* and *e* by bending the piece into the form there shown, the arm *e* being formed to project, at a right angle, horizontally from the body of the lever, while the other arm, *c*, projects in a nearly vertical position, its top being inclined toward the body E, as shown more clearly in fig. 2.

The lever E, being thus formed, is placed on the sill in the corner of the door-way, on that side to which the door is hung, as represented in fig. 2, there being a slight notch cut in the ledge L, at the extreme corner, for the lower edge of the arm *c* to rest in, the body E extending along close in front of the ledge L, and the arm *e* laying under the inner or loose edge of the strip D, as shown in fig. 2.

When the lever E is thus located, it will be seen that, as the door is closed, its rear edge will strike against the inclined arm *c* of the lever, thereby elevating its opposite end; and as it rises the arm *e*, which is under the loose edge of the strip D, will elevate the edge of the strip D also to a position opposite the groove in the fixed strip C, which it enters as the door is closed, thus forming a very secure joint, and preventing the entrance of rain, snow, dust, or wind.

As soon as the door is opened a short distance the lever E drops down, thereby permitting the hinged strip D to fall and lie flat on the sill K in front of the ledge L, the operation of the strip being thus entirely effected by the closing and opening of the door.

As the strips of molding C can be rapidly formed by machinery in common use, and the lever E be easily formed of sheet metal, the apparatus, as a whole, is rendered extremely cheap, and is so very simple as to render its getting out of order almost an impossibility.

Having thus described my invention,

What I claim is—

1. The combination of the grooved strip C and the hinged (or equivalent) strip D, arranged to operate substantially as described.

2. The combination of the movable strip D and the lever E, constructed and arranged to operate substantially as set forth.

F. C. GRIDLEY.

Witnesses:

J. W. WHITE,

ALEXR. GAMBLE.